United States Patent
Yamada et al.

(10) Patent No.: US 10,731,233 B2
(45) Date of Patent: Aug. 4, 2020

(54) COMPOSITION FOR BONDING

(71) Applicant: AGC Inc., Chiyoda-ku (JP)

(72) Inventors: Minoru Yamada, Koganei (JP);
Atsushi Yamada, Koganei (JP); Koichi Shibuya, Chiyoda-ku (JP); Shinya Kikugawa, Chiyoda-ku (JP); Keisuke Hanashima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 79 days.

(21) Appl. No.: 15/951,424

(22) Filed: Apr. 12, 2018

(65) Prior Publication Data
US 2018/0230575 A1   Aug. 16, 2018

Related U.S. Application Data

(63) Continuation of application No. PCT/JP2016/078062, filed on Sep. 23, 2016.

(30) Foreign Application Priority Data

Oct. 16, 2015   (JP) .................. 2015-205088

(51) Int. Cl.
*C22C 13/00* (2006.01)
*B23K 35/26* (2006.01)
*C03C 27/08* (2006.01)

(52) U.S. Cl.
CPC .............. *C22C 13/00* (2013.01); *B23K 35/26* (2013.01); *B23K 35/262* (2013.01); *C03C 27/08* (2013.01)

(58) Field of Classification Search
CPC ...... C22C 13/00; B23K 35/26; B23K 35/262; C03C 27/08
See application file for complete search history.

(56) References Cited

U.S. PATENT DOCUMENTS

| | | | |
|---|---|---|---|
| 6,319,461 B1 * | 11/2001 | Domi | B23K 35/262 148/400 |
| 6,793,990 B1 | 9/2004 | Sakaguchi et al. | |
| 2001/0029095 A1 | 10/2001 | Tadauchi et al. | |
| 2007/0295528 A1 | 12/2007 | Nishi et al. | |
| 2008/0241552 A1 * | 10/2008 | Chiwata | C03C 27/08 428/434 |
| 2009/0104071 A1 | 4/2009 | Yamada et al. | |

(Continued)

FOREIGN PATENT DOCUMENTS

| CN | 1144649 C | 4/2004 |
|---|---|---|
| CN | 101274823 A | 10/2008 |

(Continued)

OTHER PUBLICATIONS

JP2000208934A english translation—ESPACENET (Year: 2000).*

(Continued)

*Primary Examiner* — Anthony J Zimmer
*Assistant Examiner* — Ricardo D Morales
(74) *Attorney, Agent, or Firm* — Oblon, McClelland, Maier & Neustadt, L.L.P.

(57) ABSTRACT

A composition for bonding includes tin, germanium, and nickel. A contained amount of germanium is less than or equal to 10 mass %. A contained amount of nickel in mass % is less than or equal to a product of 2.8 multiplied by a term that is the contained amount of germanium in mass % to the power of 0.3.

17 Claims, 8 Drawing Sheets

(56) References Cited

U.S. PATENT DOCUMENTS

2009/0208363 A1    8/2009  Yamada et al.
2016/0368102 A1*  12/2016  Nishimura ............. B23K 35/26

FOREIGN PATENT DOCUMENTS

| | | |
|---|---|---|
| EP | 1 112 803 A1 | 7/2001 |
| EP | 2 468 450 A1 | 6/2012 |
| JP | 2000-208934 | 7/2000 |
| JP | 2000208934 A * | 7/2000 |
| JP | 2001-58287 | 3/2001 |
| JP | 2005-138152 A | 6/2005 |
| JP | 2008-31550 | 2/2008 |
| JP | 2009-101415 | 5/2009 |
| JP | 2009-119528 | 6/2009 |
| JP | 4503856 | 7/2010 |
| JP | 4669877 | 4/2011 |
| TW | 516984 B | 1/2003 |

OTHER PUBLICATIONS

International Search Report dated Dec. 6, 2016 in PCT/JP2016/078062 filed Sep. 23, 2016 (with English translation).
Written Opinion dated Dec. 6, 2016 in PCT/JP2016/078062 filed Sep. 23, 2016.

* cited by examiner

COMPOSITION FOR BONDING

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/078062 filed on Sep. 23, 2016 and designating the U.S., which claims priority of Japanese Patent Application No. 2015-205088 filed on Oct. 16, 2015. The entire contents of the foregoing applications are incorporated herein by reference.

BACKGROUND OF THE INVENTION

1. Field of the Invention

The disclosure herein generally relates to a composition for bonding.

2. Description of the Related Art

Conventionally, an examination has been made of a composition for bonding that can be used when a material to be bonded including a metal, an oxide or the like in a bonding portion is bonded. Particularly, because it is difficult to bond a material to be bonded including an oxide in a bonding portion, an examination has been made of a composition for bonding that can be used for bonding even in the case where the bonding portion of the material to be bonded includes an oxide.

As a composition for bonding used for bonding and sealing at a temperature around 380° C. in the case where the bonding portion of a material to be bonded includes an oxide, a solder or a glass frit is mainly used. However, for a brazing material, a brazing sheet and the like, listed in "JIS handbook (3) non-ferrous metal", which is fused at a temperature of 400° C. or lower, it is difficult to bond a glass or the like, a material to be bonded, and the brazing material with excellent adhesivity without generating a shrinkage crack in the glass or the like, due to a difference between coefficients of thermal expansion of the glass or the like and of the brazing material.

Thus, conventionally an examination has been made of a composition for bonding that can be used for bonding a material to be bonded including an oxide in a bonding portion.

For example, Japanese Patent No. 4669877 discloses a solder alloy for oxide bonding with a feature of including 2.0 to 15.0 mass % of Ag, more than 0.1 to 6.0 mass % of Al, and the remainder being composed of Sn and inevitable impurities.

Moreover, Japanese Patent No. 4503856 discloses a metal material, used for sealing hermetically a gap between a pair of glass sheets, including 72 to 99.9% of Sn, and further at least any component of Zn, Al, Si and Ti, a contained amount of lead being less than 0.1 mass %, and a liquidus temperature $T_L$ (° C.) and a strain temperature $T_S$ (° C.) of a glass sheet satisfying a relation $100 \leq T_L \leq (T_S - 100)$.

SUMMARY OF THE INVENTION

Technical Problem

In the case of bonding a pair of materials to be bonded via a composition for bonding, a method of applying in advance a composition for bonding on a bonding surface of each material to be bonded is employed.

However, according to the composition for bonding disclosed in Japanese Patent No. 4669877 and Japanese Patent No. 4503856, when the composition for bonding is molten in order to be applied on the bonding surface of the material to be bonded, an oxide layer is easily generated on a surface of the composition for bonding. Thus, a process for removing the oxide layer using ultrasonic waves upon bonding is required.

In view of the aforementioned problem in the conventional art, an aspect of the present invention aims at providing a composition for bonding that does not require the process of removing an oxide layer upon bonding.

Solution to Problem

According to an aspect of the present invention in order to solve the aforementioned problem, a composition for bonding including tin, germanium, and nickel, a contained amount of germanium being less than or equal to 10 mass %, and the contained amount of germanium and a contained amount of nickel satisfying a relation (1)

$$[Ni] \leq 2.8 \times [Ge]^{0.3} \qquad (1)$$

where [Ni] is the contained amount of nickel in mass % and [Ge] is the contained amount of germanium in mass %, can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
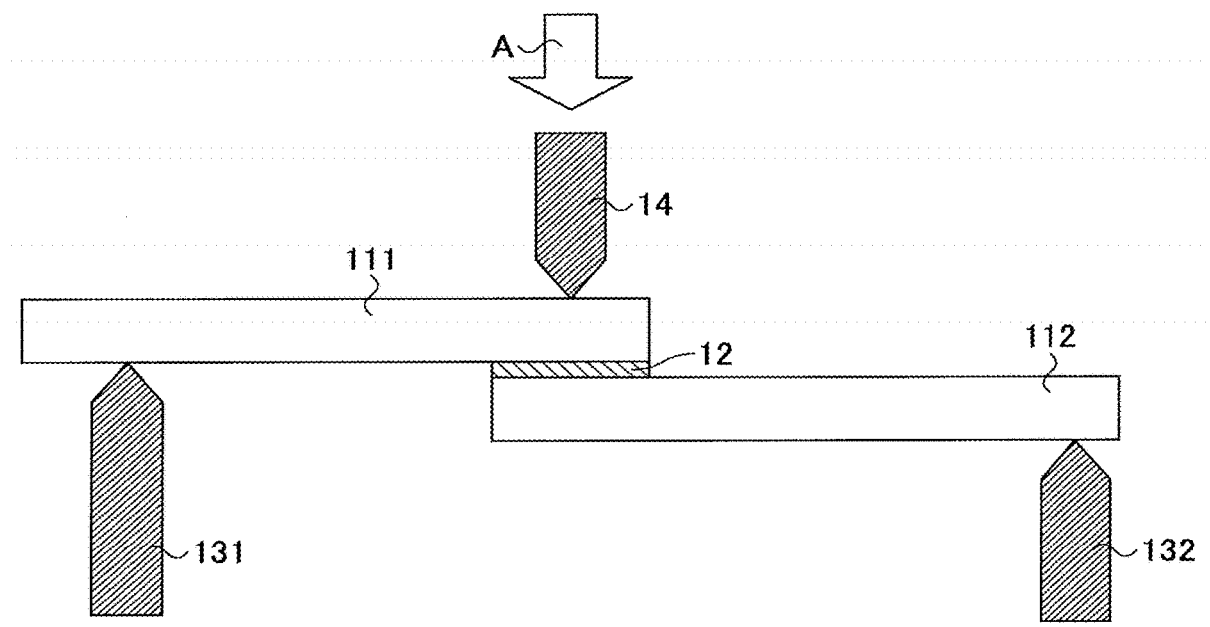
FIG. 1 is a diagram schematically illustrating a three-point bending test in order to evaluate a bonding strength in practical examples and in comparative examples.

In the following, with reference to drawings, embodiments of the present invention will be described. However, the present invention is not limited to the following specific embodiments, and various variations and modifications may be made for the following embodiments without deviating from the scope of the present invention.

In an embodiment, a configuration example of a composition for bonding will be described.

The composition for bonding according to the embodiment includes tin, germanium and nickel. A contained amount of germanium and a contained amount of nickel can satisfy the following relation (1):

$$[Ni] \leq 2.8 \times [Ge]^{0.3} \quad (1)$$

where [Ni] is the contained amount of nickel in mass %, and [Ge] is the contained amount of geranium in mass %.

In the following, the respective components that the composition for bonding according to the embodiment can include will be described.

(Tin)

The composition for bonding according to the embodiment includes tin (Sn) as described above.

Tin is capable of reducing the thermal expansion difference between the material to be bonded and the composition for bonding. Furthermore, tin has a function of lowering a melting temperature of the composition for bonding.

The composition for bonding according to the embodiment can include tin as a main component. "Including as a main component" means, for example, a component that the composition for bonding includes the most, and the composition for bonding preferably includes 60% or more of the component.

Particularly, the contained amount of tin in the composition for bonding is more preferably 85.9 mass % or more, for example, further preferably 87.0 mass % or more, and especially preferably 88.0 mass % or more.

This is because when the contained amount of tin in the composition for bonding is 85.9 mass % or more, an excellent effect is exhibited for the aforementioned reduction of the thermal expansion difference between the material to be bonded and the composition for bonding, and for the reduction of the melting temperature of the composition for bonding.

An upper limit of the contained amount of tin in the composition for bonding is not particularly limited. But, the upper limit is preferably 99.9 mass % or less, more preferably 99.5 mass % or less, and further preferably 99.3 mass % or less.

As described above, the composition for bonding according to the embodiment includes germanium and nickel in addition to tin. In the case where the composition for bonding includes these components, an oxide layer is prevented from being generated on the surface of the composition for bonding when the composition for bonding is applied on the material to be bonded. Moreover, an optional component that will be described later can also be added in the composition for bonding in addition to germanium and nickel. Thus, in order to secure a sufficient contained amount of the aforementioned components other than tin, as described above, the contained amount of tin is preferably 99.9 mass % or less.

Note that by adjusting the contained amount of germanium or the like, a hermetic sealing property between the materials to be bonded can be particularly enhanced, which will be described later. From the viewpoint of enhancing the hermetic sealing property, the contained amount of the component other than tin, such as germanium, is preferably greater than or equal to a predetermined amount. Thus, in the case of being required to particularly enhance the hermetic sealing property or the like, the upper limit of the contained amount of tin is particularly preferably 98.8 mass % or less.

(Germanium)

The composition for bonding according to the embodiment includes germanium as described above.

Germanium can control the generation of the oxide layer on the surface of the composition for bonding when the composition for bonding is applied on a bonding surface of the material to be bonded. This is because when the composition for bonding is melted in order to be applied on the bonding surface, oxidation of germanium contained in the composition for bonding is dominant, and thereby control oxidation of nickel in the composition for bonding is enabled.

The contained amount of germanium in the composition for bonding according to the embodiment is not particularly limited, but is preferably 10 mass % or less, and more preferably 8 mass % or less.

This is because when the contained amount of germanium in the composition for bonding exceeds 10 mass %, germanium itself may form an oxide excessively, and prevent the bonding with the material to be bonded.

A lower limit of the contained amount of germanium is not particularly limited, but is preferably greater than 0.5 mass %, for example, and more preferably 0.7 mass % or more.

When a composition for bonding is melted, excess oxygen is gasified, and thereby a void may occur in the composition for bonding. Particularly, when the composition for bonding is melted for bonding under a vacuum environment, a gas such as the aforementioned oxygen expands and a void easily occurs in the composition for bonding. Thus, due to the void, the hermetic sealing property between the materials to be bonded may be degraded.

In contrast, according to the embodiment, the contained amount of germanium in the composition for bonding is made greater than 0.5 mass %, and thereby a void in the composition for bonding due to excess oxygen, as described above, is prevented from occurring and the hermetic sealing property between the materials to be bonded can be particularly enhanced. Thus, it is preferable.

(Nickel)

The composition for bonding according to the embodiment includes nickel (Ni) as described above.

Nickel contained in the composition for bonding has a strong tendency to form an oxide, when the composition for bonding is melted. Thus, in the case where an oxide is contained in a bonding portion of the material to be bonded, the oxide in the bonding portion and the composition for bonding are easily joined with each other, wettability between the composition for bonding and the bonding portion containing the oxide is enhanced, and a great bonding strength can be exerted.

The contained amount of nickel in the composition for bonding according to the embodiment is not particularly limited, but preferably has a specific relation with the contained amount of germanium.

Specifically, the contained amount of nickel in mass % [Ni] and the contained amount of germanium in mass % [Ge] preferably have a following relation (1).

$$[Ni] \leq 2.8 \times [Ge]^{0.3} \quad (1)$$

This is because in the case where the contained amount of nickel in mass % [Ni] in the composition for bonding exceeds $2.8 \times [Ge]^{0.3}$, when the composition for bonding is melted in order to be applied on a bonding surface of the material to be bonded, a part of the composition for bonding may remain without being melted into a particle configuration, and cannot be used for bonding.

Particularly, the contained amount of nickel in mass % [Ni] and the contained amount of germanium in mass % [Ge] more preferably satisfy a relation $[Ni] \leq 2.4 \times [Ge]^{0.3}$, and further preferably satisfy a relation $[Ni] \leq 2.0 \times [Ge]^{0.3}$.

A lower limit of the contained amount of nickel in the composition for bonding according to the embodiment is not particularly limited, but is only required to be greater than 0 mass %.

Moreover, a value obtained by dividing the contained amount of nickel in mass % [Ni] by the contained amount of germanium in mass % [Ge] is preferably less than 2.0, and more preferably less than 1.5. That is, both contained amounts preferably satisfy a relation [Ni]/[Ge]<2.0, and more preferably satisfy a relation [Ni]/[Ge]<1.5.

This is because when the value [Ni]/[Ge] is greater than or equal to 2.0, on the surface of the composition for bonding that is melted for being applied onto the bonding surface of the material to be bonded, an oxide layer of nickel may occur; accordingly the bonding may be inhibited. Note that the oxide layer of nickel means an oxide layer containing a relatively greater amount of nickel among metal components.

Moreover, a value obtained by dividing the contained amount of nickel in mass % [Ni] by the contained amount of germanium in mass % [Ge] is preferably greater than or equal to 0.005, and more preferably greater than or equal to 0.01. That is, both contained amounts preferably satisfy a relation 0.005≤[Ni]/[Ge], and more preferably satisfy a relation 0.01≤[Ni]/[Ge].

This is because when the value [Ni]/[Ge] is less than 0.005, the composition for bonding cannot retain a sufficient amount of oxygen, and in the case where the bonding portion of the material to be bonded contains oxides, wettability for the oxides in the bonding portion may decrease, and the hermetic sealing property between the materials to be bonded may be degraded.

Furthermore, a sum of the contained amount of germanium and the contained amount of nickel is preferably greater than 1.2 mass %. This is because when the sum of the contained amount of germanium and the contained amount of nickel in the composition for bonding is greater than 1.2 mass %, the hermetic sealing property between the materials to be bonded can be particularly enhanced.

(Iridium)

The composition for bonding according to the embodiment can further include also iridium (Ir).

In the case where the composition for bonding according to the embodiment includes iridium, a void in the composition for bonding, when the composition for bonding is melted, can be prevented from occurring. The reason why occurrence of a void in the composition for bonding, when the composition for bonding is melted, can be controlled is not clear. However, it is estimated that iridium reduces a surface tension of a molten metal and thereby drawn in gas can be reduced.

In this way, the generation of a void, when the composition for bonding is melted, can be controlled, a sufficient bonding area to the material to be bonded can be secured, and thereby the bonding strength can be enhanced. Moreover, because a leakage path can be prevented from occurring, the hermetic sealing property between the materials to be bonded can be enhanced.

Moreover, coarsening of eutectic crystals in the composition for bonding may decrease a degree of expansion and strength of a bonding portion for bonding the materials to be bonded, when the composition for bonding is melted and solidified to form the bonding portion, and may cause an occurrence of a crack in the bonding portion. However, when the composition for bonding contains iridium, coarsening of eutectic crystals can be controlled against, and a crack that causes a decrease in hermetic property can be prevented from occurring.

Note that a composition for bonding is generally manufactured into a wire shape and used as a wire solder. However, the wire solder including coarse crystals is brittle and awkward to handle. In contrast, because the composition for bonding according to the embodiment includes iridium, coarsening of eutectic crystals in the composition for bonding can be controlled. Thus, a handling property of the composition for bonding according to the embodiment can be prevented from degrading by including iridium, even if the composition for bonding is formed into a wire solder.

The aforementioned eutectic substance contained in the composition for bonding includes, for example, a Ge—Ni eutectic substance that is formed with germanium and nickel.

A contained amount of iridium in the composition for bonding according to the embodiment is not particularly limited, but is preferably 0.1 mass % or less, for example, more preferably 0.025 mass % or less, and further preferably 0.005 mass % or less.

This is because when the contained amount of iridium in the composition for bonding exceeds 0.1 mass %, when the composition for bonding is melted, an oxide layer may be generated on a surface of the composition for bonding, and the bonding of the materials to be bonded may be inhibited.

Moreover, in the case where the contained amount of iridium in the composition for bonding is 0.025 mass % or less, the hermetic sealing property between the material to be bonded can be particularly enhanced. Thus, it is more preferable.

A lower limit of the contained amount of iridium is also not particularly limited, but can be greater than or equal to 0 mass %, for example, and preferably greater then or equal to 0.0005 mass %.

(Zinc)

The composition for bonding according to the embodiment can further include also zinc (Zn).

In the case where the composition for bonding contains zinc, when the composition for bonding is melted, zinc has a strong tendency to form an oxide. Thus, in the case where an oxide is contained in a bonding portion of the material to be bonded, the oxide in the bonding portion and the composition for bonding are easily joined with each other, wettability between the composition for bending and the bonding portion containing the oxide is enhanced, and a great bonding strength can be exerted.

A contained amount of zinc in the composition for bonding according to the embodiment is not particularly limited, but preferably less than or equal to 0.5 mass %.

This is because when the contained amount of zinc in the composition for bonding exceeds 0.5 mass %, when the composition for bonding is melted, an oxide layer may occur on a surface of the composition for bonding, and the bonding of the materials to be bonded may be inhibited.

A lower limit of the contained amount of zinc is also not particularly limited, but can be greater then or equal to 0 mass %, for example.

(Oxygen)

Further, the composition for bonding according to the embodiment can include oxygen.

When the bonding portion of the material to be bonded includes oxides, oxygen in the composition for bonding becomes a component of facilitating bonding of the composition for bonding with the bonding portion including the oxides.

A state of oxygen contained in the composition for bonding is not particularly limited, but is preferably contained in a form of being dissolved in a metal material of the composition for bonding, for example. This is because at an interface between the composition for bonding and the material to be bonded, a change in an oxygen concentration is gradual between the oxide in the bonding portion of the material to be bonded and the metal material in the composition for bonding, and thereby a bonding interface becomes strong.

A method of introducing oxygen into a composition for bonding is not particularly limited, but includes, for example, a manufacturing method of dissolving a composition for bonding under an atmosphere containing oxygen and/or a method of performing a process of bonding with a material to be bonded under an atmosphere containing oxygen.

Note that the composition for bonding before bonding with the material to be bonded preferably satisfies a contained amount of oxygen in the composition for bonding, which will be described later. Thus, the oxygen concentration is preferably adjusted by using the manufacturing method of dissolving a composition for bonding under an atmosphere containing oxygen.

Particularly, in any state of the composition for bonding before bonding with the material to be bonded and of the composition for bonding after bonding with the material to be bonded, the contained amount of oxygen in the composition for bonding as described later is more preferably satisfied.

The contained amount or oxygen in the composition for bonding is not particularly limited, but can be greater than or equal to 0.0001 mass %, for example, and is preferably 0.0007 mass % or more.

This is because when the contained amount of oxygen is greater than or equal to 0.0001 mass %, an effect of enhancing the bonding strength can be fully exerted.

An upper limit of the contained amount of oxygen in the composition for bonding is not particularly limited, but can be less than or equal to 2 mass %, for example, and is preferably 1 mass % or less.

This is because when an amount of oxygen contained in the composition for bonding becomes excessively great, a deposition of oxides inside the composition for bonding may easily occur, and the bonding strength may be lowered. Thus, the contained amount of oxygen in the composition for bonding is preferably 2 mass % or less, as described above.

Note that the aforementioned contained amount of oxygen in the composition for bonding indicates a contained amount of oxygen that is contained inside the composition for bonding. That is, in the case where an oxide layer is formed on a surface of the composition for bonding, the aforementioned contained amount of oxygen indicates a contained amount of oxygen in the composition for bonding after removing the oxide layer.

A method for removing the oxide layer, when the contained amount of oxygen in the composition for bonding is measured, is not particularly limited. For example, the oxide layer can be removed by processing the surface of the composition for bonding by using an acid or the like.

The contained amount of oxygen in the composition for bonding can be measured, for example, by the following procedures (1) to (3):

(1) As a sample for analysis, 0.5 g of a small piece of the prepared composition for bonding is provided.

(2) A chemical etching is performed in order to eliminate an influence of an oxide layer contained in a surface of the small piece of the composition for bonding provided in step (1).

Specifically, a beaker, in which a small piece of the composition for bonding and hydrochloric acid of two-fold dilution are added, is set in a water bath, and heated at 80° C. for 12 minutes. Afterwards, decantation was performed with degassed water, and next decantation was performed with ethanol.

(3) An oxygen concentration is measured for the sample of the composition for bonding in which an oxide layer was removed in step (2). The measurement was performed by using an oxygen/hydrogen elemental analyzer (by LECO Corporation, form: ROH-600).

As described above, the respective components that the composition for bonding according to the embodiment can contain have been explained. However, the present invention is not limited to the aforementioned materials. Moreover, the composition for bonding according to the embodiment may contain an unavoidable component which is generated during the preparation of the composition for bonding, for example. The unavoidable component is not particularly limited. However, in the case where the unavoidable component includes one element or two or more elements selected from a group including Fe, Co, Cr, V, Mn, Sb, Pb, Bi, Zn, As, and Cd, a sum of contained amounts of the aforementioned elements is preferably 1 mass % or less, and more preferably the sum is 500 ppm or less.

This is because the aforementioned elements have a function of lowering the wettability of the composition for bonding to the material to be bonded, and by making the total contained amount of the aforementioned elements 1 mass % or less, the wettability of the composition for bonding to the material to be bonded can be prevented from being lowered.

Moreover, in the case where the unavoidable component includes one element or two or more elements selected from a group including Ga, P and B, a sum of contained amounts of the aforementioned elements is preferably 500 ppm or less, and more preferably the sum is 100 ppm or less, because the elements Ga, P and B cause an occurrence of a void.

Moreover, the composition for bonding according to the embodiment preferably does not contain silver (Ag).

This is because silver generates an intermetallic compound ($Ag_3Sn$). When the intermetallic compound ($Ag_3Sn$) is present on the surface of the composition for bonding, due to the high melting point of $Ag_3Sn$, the wettability with the material to be bonded may be slightly lowered.

Such a phenomenon, in which the wettability with the material to be bonded is lowered, is not a problem for the conventional composition for bonding which is bonded with removing oxide layers by using an ultrasonic soldering iron. However, in the case of performing bonding in conditions, in which the action of removing oxide layers is not applicable, the phenomenon may be a factor of inhibiting the bonding.

In addition, a meaning that the composition for bonding does not contain silver is that when the composition for bonding is dissolved with acid and analyzed by an ICP emission spectroscopic analysis method, a detected value of silver is less than or equal to a detection limit value.

In a cross section of the composition for bonding according to the embodiment, in the case where, for an eutectic substance existing in a region having an area of $1.0 \times 10^6$ μm$^2$ at any given position, and a circle inscribing the eutectic substance at a minimum diameter is formed for each eutectic substance, a number of circles with diameters of 220 μm or more is preferably less than or equal to two, or a number of circles with diameters of 350 μm or more is preferably less than or equal to one.

Moreover, in a cross section of the composition for bonding according to the embodiment, a region having an area of $1.0 \times 10^6$ μm$^2$ including two or less eutectic substances each having an area of 2000 μm$^2$ or more, or one or less eutectic substances each having an area of 4000 μm$^2$ or more are present.

Note that the composition for bonding according to the embodiment, at least before bonding the material to be bonded, preferably satisfies any of or both the aforementioned requirements for eutectic substances in a region in a cross section of the composition for bonding. Particularly, the composition for bonding according to the embodiment, both before bonding the material to be bonded and after bonding the material to be bonded, more preferably satisfies any of or both the aforementioned requirements for eutectic substances in a region in a cross section of the composition for bonding. That is, even when an evaluation is performed for eutectic substances in a region in a cross section of the composition for bonding at any timing, the composition for bonding according to the embodiment more preferably satisfies any of or both the aforementioned requirements.

A shape of the aforementioned region having an area of $1.0 \times 10^6$ μm$^2$ is not particularly limited, and any shape is allowed. The shape of the aforementioned region includes, for example, a square, a rectangle, and a polygon. In the case where the shape is a square, a length of one side can be set to $1.0 \times 10^3$ μm. Moreover, in the case where the shape is a rectangle, lengths of respective sides can be selected so as to secure the aforementioned area, e.g. to set to a rectangle of 400 μm×2500 μm. Also in the case where the shape is a polygon, lengths of respective sides can be selected so as to secure the aforementioned area, and the lengths of the respective sides configuring the polygon are not limited.

The aforementioned eutectic substance contained in the composition for bonding includes, for example, a Ge—Ni eutectic substance formed of germanium and nickel.

As described above, coarsening of eutectic crystals in the composition for bonding may decrease expansion and strength of a bonding portion for bonding the materials to be bonded, when the composition for bonding is melted and solidified to form the bonding portion, and may cause an occurrence of a crack in the bonding portion. However, when eutectic substances in the cross section of the composition for bonding satisfy the aforementioned condition, coarsening of eutectic crystals can be controlled, and a crack that causes a decrease in the hermetic property can be prevented from occurring.

Moreover, the composition for bonding can be manufactured into a wire shape and can be used as a wire solder. In the case where eutectic substances in a cross section of the composition for bonding satisfy the aforementioned condition, coarsening of eutectic crystals in the composition for bonding can be controlled, and the composition for bonding has a sufficient handling property when the composition for bonding is formed into a wire solder.

As described above, the composition for bonding according to the embodiment has been described. However, the material to be bonded that is bonded by the composition for bonding according to the embodiment is not particularly limited. The composition for bonding can be used for bonding a wide variety of materials to be bonded. The material to be bonded includes, for example, a metal or an oxide. The composition for bonding can be used for bonding between metals, bonding between oxides, and bonding between a metal, and an oxide.

Particularly, in the case where the bonding portion of the material to be bonded contains oxides, conventionally it has been difficult to provide a sufficient bonding strength. However, the composition for bonding according to the embodiment can exert a great bonding strength. Thus, the composition for bonding according to the embodiment can be preferably used for bonding a material to be bonded which contains oxides in a bonding portion.

Moreover, the oxides contained in the bonding portion of the material to be bonded are not particularly limited. However, the oxides are preferably a type or two or more types selected from a group including a glass, a chrome oxide, and an aluminum oxide, for example. The chrome oxide includes a chrome oxide formed on a surface of a stainless steel. Moreover, the aluminum oxide includes a passivation layer formed on a surface of an aluminum metal or an oxidized aluminum.

With the aforementioned composition for bonding according to the embodiment, an oxide layer can be prevented from being formed on a surface when the composition for bonding is melted, and thereby a bonding with the material to be bonded can be performed without removing oxide layers.

Note that there is also a need for bonding the material to be bonded under a vacuum environment. But, it is quite difficult to use an ultrasonic soldering iron or the like for removing oxide layers under a vacuum environment. Thus, when the composition for bonding is melted in order to be applied to the bonding surface of the material to be bonded, an oxide layer is generated on the surface of the composition for bonding. For the conventional composition for bonding in which oxide layers are required to be removed by an ultrasonic soldering iron or the like, it has been difficult to perform bonding under a vacuum environment. In contrast, with the composition for bonding according to the embodiment, when the composition for bonding is melted in order to be applied on the bonding surface of the material to be bonded, an oxide layer can be prevented from being formed on the surface of the composition for bonding. Thus, the ultrasonic soldering iron is not required to be used upon bonding, and the composition for bonding can be applied to the bonding under the vacuum environment.

Moreover, when the conventional composition for bonding is melted under a vacuum environment, a gas such as oxygen contained in the composition for bonding expands, and a void occurs in the bonding portion for bonding between the materials to be bonded, and causes degradation of the hermetic sealing property and the bonding strength.

In contrast, with the most preferable mode of the composition for bonding according to the embodiment, even in the case of melting the composition for bonding in a vacuum state, excess oxygen gas can be prevented from being generated. Thus, a void can be prevented from occurring in the bonding portion, and the hermetic sealing property and the bonding strength can be enhanced sufficiently.

EXAMPLES

In the following, the present invention will be described with reference to a specific example. However, the present invention is not limited to the practical examples.

First, an evaluation method for a composition for bonding manufactured in the following practical examples and comparative examples will be explained.

(Bonding Strength Test)

A test piece was provided by joining two sheets of glass with the composition for bonding prepared in the following practical examples and the comparative example, and a three-point bending test was performed for the test piece, and thereby a bonding strength (in units of N/mm$^2$) was measured.

Figure 2A:
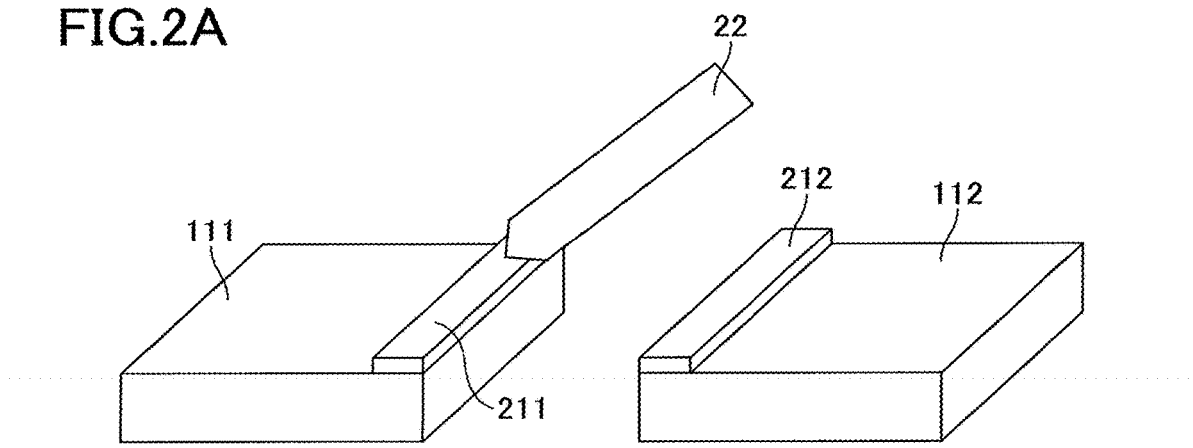
FIGS. 2A to 2D are diagrams schematically illustrating a procedure of preparing a test piece for the three-point bending test.
Figure 2B:
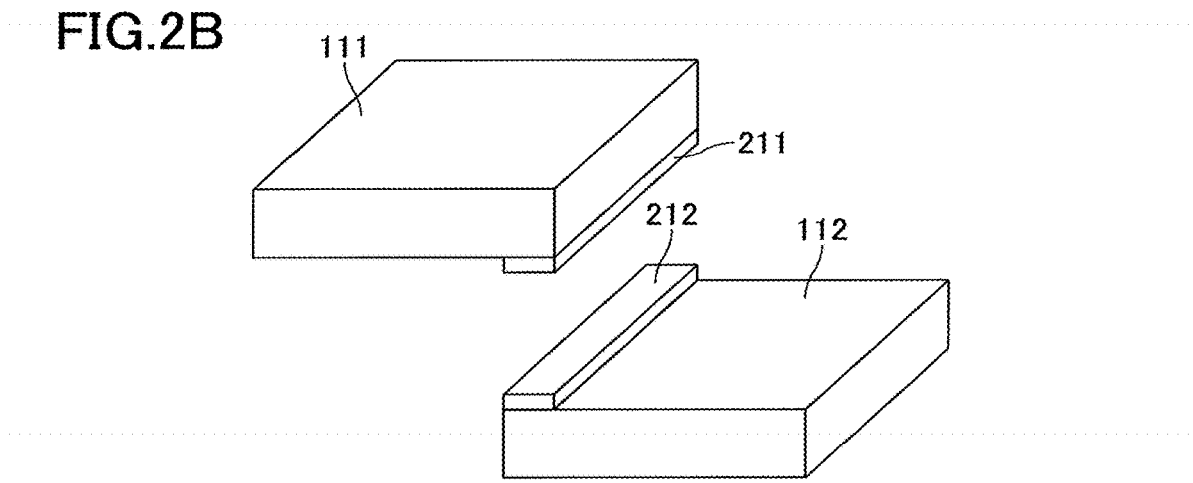
Figure 2C:
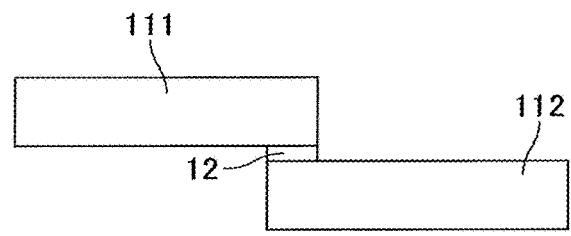
Figure 2D:
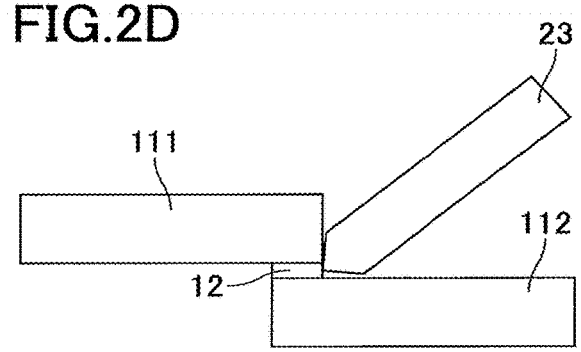

With reference to FIGS. 1 to 2D, specific procedures for the test will be described. FIG. 1 schematically illustrates a cross section of the test piece cut along a plane that is parallel to a laminating direction of the two sheets of glass configuring the test piece. Moreover, FIGS. 2A to 2D are diagrams for explaining a procedure of preparing the test piece illustrated in FIG. 1. For the same member in FIGS. 1 to 2D, the same reference number is assigned.

As illustrated in FIG. 1, for the three-point bending test, a test piece was used in which two sheets of soda lime glass substrates 111, 112 were positioned with each other for an adhesive margin with a length of 5 mm, bonded by a composition for bonding portion 12 configured with the composition for bonding. A bottom surface of the test piece, in which the glass substrates were bonded, was supported by support fixtures 131, 132, a load was applied to a part of the adhesive margin on an upper surface of the bonded test piece in a direction indicated by a block arrow "A" via a pressing fixture 14, and thereby the three-point bending test was performed.

In the three-point bending test, a load when the bonding portion peeled and the test piece was divided into two glass plates or when the test piece was broken down was measured. The measured value was regarded as the bonding strength of the composition for bonding used in the bending test.

A load evaluation testing device (by AIKOH Engineering Co., Ltd., MODEL-1308) was used.

Next, a procedure of preparing the test piece illustrated in FIG. 1 will be described with reference to FIGS. 2A to 2D.

As illustrated in FIG. 2A, two sheets of soda lime glass substrate 111, 112 each having a size of 5 mm (thickness)×30 mm (length)×30 mm (width) were provided. Then, the composition for bonding prepared in each practical example or comparative example was heated by a soldering iron 22 at the temperature 300° C., and applied in the adhesion margin (5 mm (length)×30 mm (width)) arranged along a side of each of the soda lime glass substrates 111, 112, and thereby the composition for bonding portion 211, 212 was formed.

Afterwards, the respective soda lime glass substrates 111, 112 and the applied composition for bonding were cooled, and the composition for bonding was solidified to the extent that the composition for bonding did not flow, specifically the composition for bonding did not flow even if front and rear surfaces of the respective soda lime glass substrates 111, 112 were inverted. Note that, at this time, the composition for bonding was cooled to a temperature of 160° C. or lower.

Next, as illustrated in FIG. 2B, the front and rear surfaces of the soda lime glass substrate 111 were inverted, and the composition for bonding portions 211, 212 formed by applying on the adhesive margins of the soda lime glass substrates 111, 112 were brought into contact with each other. Then, the soda lime glass substrates 111, 112 were put into an electric furnace in a state where the formed composition for bonding portions 211, 212 were brought into contact with each other, and heated to a temperature of 300° C.

After heating, the soda lime glass substrates and the composition for bonding were cooled, and the composition for bonding was solidified. Thus, a test piece having an integrated composition for bonding portion 12, as illustrated in FIG. 2C was provided.

Note that there were test pieces in which the composition for bonding portions 211, 212 applied on the respective soda lime glass substrates were not integrated even if the composition for bonding portions 212, 212 formed by applying on the adhesive margins of the soda lime glass substrates 111, 112 were brought into contact with each other and heated. Such test pieces were classified into comparative examples 1 to 5.

In the comparative examples 1 to 3, a part of the composition for bonding portions 211, 212 was not melted even when the composition for bonding portions were heated, because solid particles were present. The composition for bonding portions 211, 212 could not be bonded even if a soldering iron was used.

Moreover, in the comparative examples 4 and 5, extremely thin oxide layers were generated on surfaces of the composition for bonding portions 211, 212. In the comparative example 4, as illustrated in FIG. 2D, only by causing slight contact of a soldering iron 23 with the composition for bonding portions 211, 212 so as to be inserted between the composition for bonding portions 211 and 212 formed by application on the respective soda lime glass substrates 111, 112, the oxide layers formed on the surfaces of the composition for bonding portions 211, 212 could be easily fractured, and an integrated composition for bonding portion 12 could be provided.

However, in the comparative example 5, even if the composition for bonding portions 211, 212 formed by applying on the adhesive margins of the soda lime glass substrates 111, 112 were brought into contact with each other and heated, or even if a soldering iron was contacted with the composition for bonding portions 211, 212, the composition for bonding portions 211 212 formed by application on the respective soda lime glass substrates could not be bonded. Then, instead of the normal soldering iron, a soldering iron having an ultrasonic shock function was used to remove strong oxide layers formed on the surfaces of the composition for bonding portions 211, 212, and thereby the bonding was performed.

(Hermetic Test)

Figure 3A:
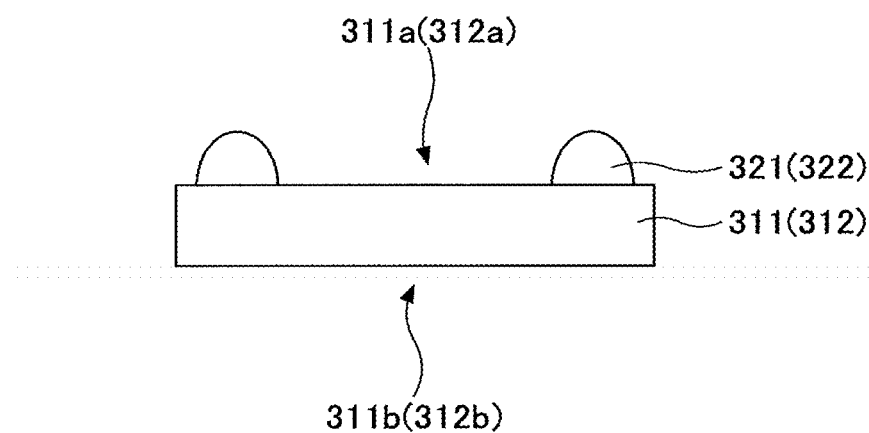
FIGS. 3A and 3B are diagrams schematically illustrating a procedure of preparing a test piece for a leak test.
Figure 3B:
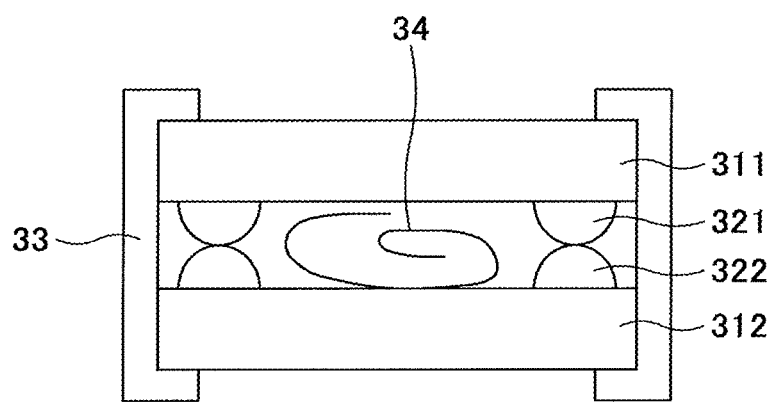
Figure 4:
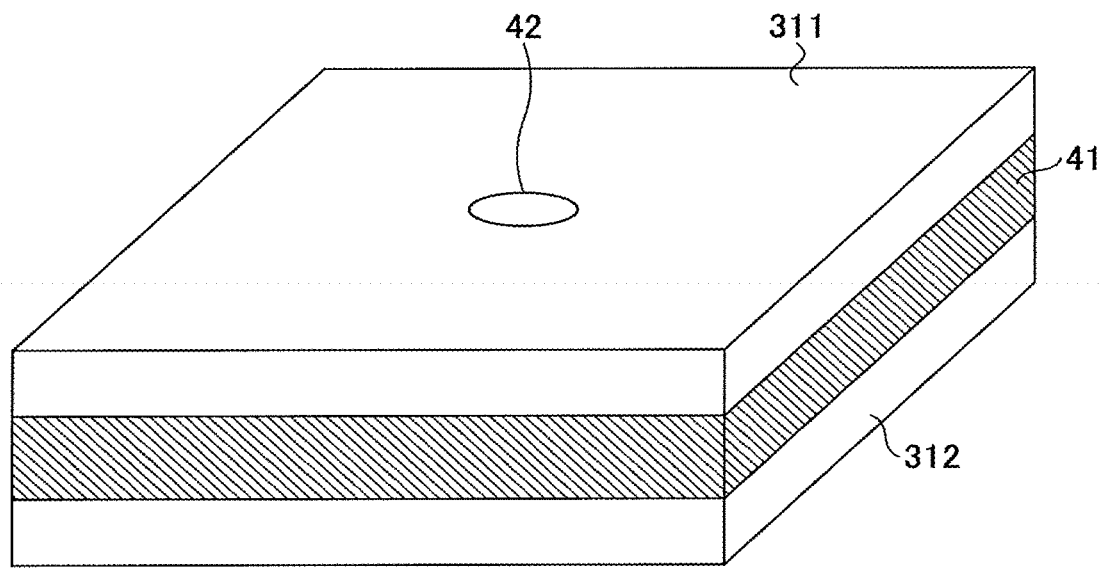
FIG. 4 is a diagram schematically illustrating the test piece for the leak test.

With reference to FIGS. 3A to 4, a method of hermetic test will be described. FIGS. 3A and 3B are diagrams depicting a procedure of preparing a test piece for the hermetic test. FIG. 4 is a perspective view of the test piece for the hermetic test.

As illustrated in FIG. 3A, soda lime glass substrates 311, 312, each having a size of 5 mm (thickness)×100 mm (length)×100 mm, were provided. Note that one of the soda lime glass substrate 311 had a hole (not shown) with a diameter of 3 mm in a central portion that was formed in advance.

On peripheries of one plane surface 311a of the soda lime glass substrate 311 and of one plane surface 312a of the soda lime glass substrate 312, i.e. along four sides of each plane surface, the composition for bonding prepared in each of the practical examples and the comparative examples was applied with a width of about 2 mm. Then, the soda lime glass substrates 311, 312 were heated from the other plane surface 311b of the soda lime glass substrate 311 and from the other plane surface 312b of the soda lime glass substrate 312, so that temperatures on the soda lime glass substrates 311, 312 were 280° C.

The soda lime glass substrates and the applied composition for bonding were cooled, and the composition for bonding was solidified to the extent that the composition for bonding did not flow, specifically the composition for bonding did not flow even if front and rear surfaces of the respective soda lime glass substrates 111, 112 were inverted. Thus, composition for bonding portions 321, 322 were formed. Note that, at this time, the composition for bonding was cooled to a temperature of 160° C. or lower.

Next, as illustrated in FIG. 3B, the soda lime glass substrates 311, 312 were overlaid to each other so that the surfaces, on which the compositions for bonding were applied, faced each other, i.e. the one plane surface 311a and the one plane surface 312a faced each other. At this time, the composition for bonding portions 321, 322 were arranged so that the composition for bonding portions 321, 322 formed on the respective soda lime glass substrates were brought into contact with each other. The soda lime glass substrates 311, 312 were fixed by a clip 33 so that the composition for bonding portions 321, 322 were brought into contact with each other and were not shifted from each other also during heating. The soda lime glass substrates 311, 312 were heated to a temperature of 280° C. under a vacuum, and adhered to each other. Afterwards, the soda lime glass substrates were cooled, and thereby a test piece was provided.

Note that when the soda lime glass substrate 311 and the soda lime glass substrate 312 were overlaid to each other and heated, because a stainless steel piece with a thickness of 0.35 mm was interposed, as a spacer 34, between both the soda lime glass substrates, the soda lime glass substrates 311, 312 formed a vessel having a space with a height of 0.35 mm inside.

According to the aforementioned procedure, as illustrated in FIG. 4, a container 40 in which the soda lime glass substrate 331 and the soda lime glass substrate 312 were bonded by the composition for bonding portion 41 was obtained. Note that, as described above, the one soda lime glass substrate 311 had a through-hole 42 with a diameter of 3 mm in a central portion, which opened into a space that was between the soda lime glass substrates 311, 312 and that was surrounded by the composition for bonding portion 41.

However, in the comparative example 1 to the comparative example 5, even if the soda lime glass substrates were overlaid to each other and heated, the composition for bonding portions formed on the respective soda lime glass substrates were not integrated.

In the test piece of the comparative example 1 to the comparative example 3, because a granular solid was generated, in the same way as the test piece prepared for the bonding strength test, and the composition for bonding portions could not be bonded even if a soldering iron or the like was used.

For the test piece of the comparative example 4, the composition for bonding portions could be integrated by causing slight contact of a soldering iron with the composition for bonding portions so as to be inserted between the composition for bonding portions.

Moreover, for the test piece of the comparative example 5, the composition for bonding portions could be integrated by causing slight contact of a soldering iron having an ultrasonic shock function with the composition for bonding portions so as to be inserted between the composition for bonding portions.

Then, for the container 40 obtained as above, using a leak detector (HELIOT 700, by ULVAC Inc.), with vacuum degassing the space in the vessel 40 from the through-hole 42, and with spraying a He gas onto the respective composition for bonding portions, a leakage amount was measured.

When the leakage amount was less than or equal to $1.0 \times 10^{-11}$ (Pa·m$^3$/s), it was determined to be "pass". Moreover, when the leakage amount was greater than $1.0 \times 10^{-11}$ (Pa·m$^3$/s), it was determined to be "fail". Note that in TABLE 1 and TABLE 2, "pass" is indicated by "O" and "fail" is indicated by "X".

(Evaluation of Eutectic Substances in a Cross Section of the Composition for Bonding)

In a cross section of the composition for bonding that was prepared, for an eutectic substance existing in a square region with an area of $1.0 \times 10^6$ μm$^2$ at an optional position, a circle inscribing the eutectic substance at a minimum diameter was formed for each eutectic substance, and a number of circles including eutectic substances with diameters of 220 μm or more was evaluated.

Moreover, the cross section of the composition for bonding was observed by using an optical microscope.

Furthermore, the evaluation was performed after a composition for bonding was prepared and after two glass substrates than were materials to be bonded were bonded using the composition for bonding.

The present test was performed only for the composition for bonding according to the practical examples 11, 19 and 20.

(Environmental Test)

A test piece was prepared in the same way as the case of the aforementioned hermetic test except that soda lime glass substrates having a dimension of 5 mm (thickness)×50 mm (length)×50 mm as the soda lime glass substrates 311, 312 were used.

The test piece prepared as above was placed into an autoclave containing water, retained under a condition of a temperature of 121° C. and a pressure of 2 atm for 478 hours, and afterwards a leakage amount was measured in the same way as the case of the aforementioned hermetic test. A criterion for determining was the same as the case of the aforementioned hermetic test.

Note that the present test was performed only for the composition for bonding according to the practical example 16.

Compositions for bonding according to the respective practical examples and comparative examples will be described in the following.

Practical Example 1

Sn, Ge, Ni and Ir were weighted so that the composition for bonding was composed of the respective components shown in TABLE 1, mixed and melted, to once form a raw material alloy. Then, after the raw material alloy was melted and poured into a mold, a composition for bonding was prepared.

Then, for the composition for bonding that was prepared as above, the aforementioned bonding strength test and the hermetic test were performed. Results of the tests are shown in TABLE 1.

Note that in TABLE 1, a contained amount of Sn is denoted by "residue". This description means that the contained amount of Sn is a residue obtained by subtracting contained amounts of contents other than Sn shown in TABLE 1 from 100 mass %. The same applies to the practical examples other than the practical example 1 and the comparative examples.

Practical Examples 2 to 47

The composition for bonding was prepared in the same way as the case of the practical example 1, except that when the composition for bonding was prepared, for each practical example, Sn, Ge, Ni, and Ir were weighted so that the composition for bonding was composed of the respective components shown in TABLE 1 and TABLE 2 and mixed, and evaluation was performed.

Results of evaluation are shown in TABLE 1 and TABLE 2.

Figure 8B:
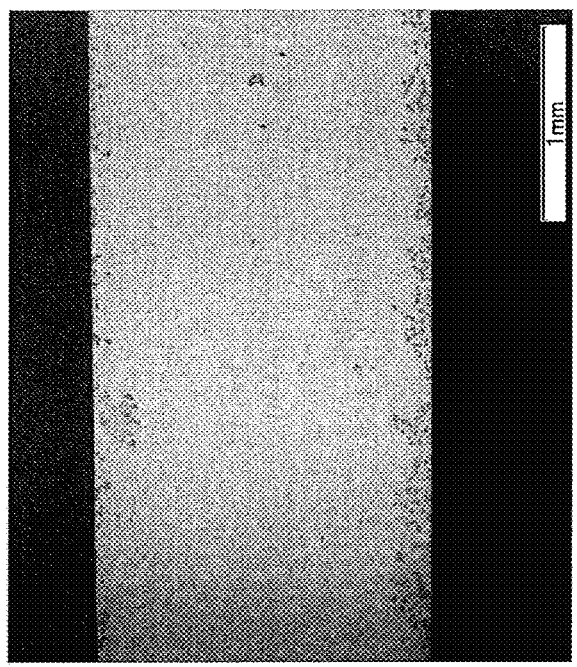
FIGS. 8A to 8C illustrate optical photomicrographs of cross sections of the compositions for bonding according to the practical examples 11, 19 and 20.
Figure 8C:
Figure 8A:
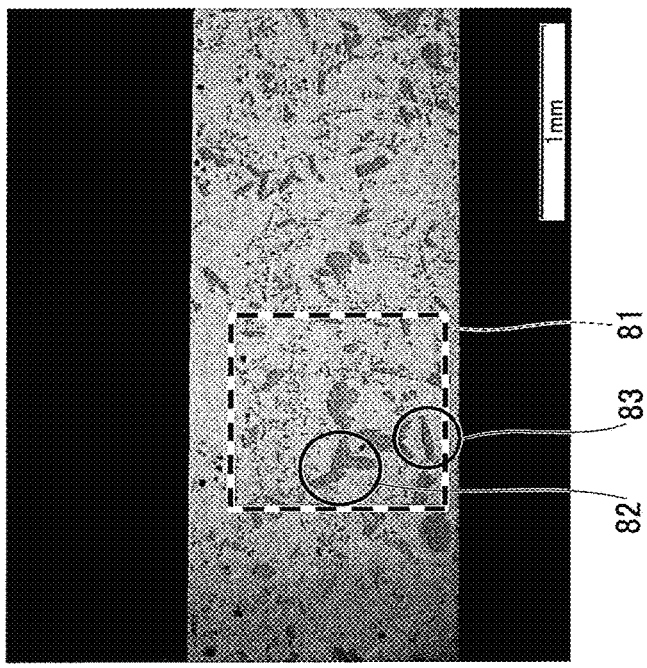

Note that for the practical examples 11, 19 and 20, eutectic substances in a cross section of the composition for bonding prepared as above were evaluated. Images of cross sections of the compositions for bonding by an optical microscope taken in the evaluation are shown in FIGS. 8A to 8D. FIGS. 8A to 8C show images of the cross sections of the compositions for bonding according to the practical examples 11, 19 and 20, respectively, by the optical microscope.

In FIG. 8A, when, for an eutectic substance existing in a square region 81, indicated by dotted lines in the image, with an area of $1.0 \times 10^6$ μm$^2$, a circle inscribing the eutectic substance at a minimum diameter was formed for each eutectic substance, two circles 82, 83 with diameters of 220 μm or more are shown. Note that the circle 82 has a diameter of 360 μm, and the circle 83 has a diameter of 240 μm. Diameters of circles other than the circles 82, 83 are 220 μm or less.

Also in FIGS. 8B and 8C, in the same way as above, for an eutectic substance existing in a square region with an area of $1.0 \times 10^6$ μm$^2$ at an optional position in a cross section of the composition for bonding, a circle inscribing the eutectic substance at a minimum diameter was formed for each eutectic substance. However, a circle having a diameter of 220 μm or more was absent.

Moreover, for the practical example 16, the evaluation of the environmental test was also performed, and a result of evaluation was found to be "pass".

Comparative Examples 1 to 5

The composition for bonding wan prepared in the same way as the case of the practical example 1, except that when the composition for bonding was prepared, for each comparative example, the respective components were weighted so that the composition for bonding was composed of the respective components shown in TABLE 2 and mixed, and evaluation was performed.

Results of evaluation are shown in TABLE 2.

TABLE 1

| | contained component (mass %) | | | | | | bonding process | bonding strength (N/mm$^2$) | hermetic test |
|---|---|---|---|---|---|---|---|---|---|
| | Sn | Ge | Ni | Ir | Ag | Al | | | |
| practical example 1 | residue | 0.7 | 0.5 | 0.001 | — | — | external force not required | 2.8 | ○ |
| practical example 2 | residue | 0.7 | 0.7 | 0.001 | — | — | external force not required | 3.3 | ○ |
| practical example 3 | residue | 0.7 | 1.0 | 0.001 | — | — | external force not required | 4.3 | ○ |
| practical example 4 | residue | 0.9 | 0.7 | 0.001 | — | — | external force not required | 2.2 | ○ |
| practical example 5 | residue | 1.0 | 0.5 | 0.001 | — | — | external force not required | 2.5 | ○ |
| practical example 6 | residue | 1.0 | 1.0 | 0.001 | — | — | external force not required | 1.9 | ○ |
| practical example 7 | residue | 1.0 | 1.4 | 0.001 | — | — | external force not required | 1.9 | ○ |
| practical example 8 | residue | 1.2 | 0.7 | 0.001 | — | — | external force not required | 2.4 | ○ |
| practical example 9 | residue | 1.2 | 1.0 | 0.001 | — | — | external force not required | 2.7 | ○ |
| practical example 10 | residue | 1.2 | 1.2 | 0.001 | — | — | external force not required | 2.0 | ○ |
| practical example 11 | residue | 1.5 | 1.0 | 0 | — | — | external force not required | 1.3 | ○ |
| practical example 12 | residue | 1.5 | 0.1 | 0.001 | — | — | external force not required | 3.3 | ○ |
| practical example 13 | residue | 1.5 | 0.3 | 0.001 | — | — | external force not required | 3.4 | ○ |
| practical example 14 | residue | 1.5 | 0.5 | 0.001 | — | — | external force not required | 5.6 | ○ |
| practical example 15 | residue | 1.5 | 0.7 | 0.001 | — | — | external force not required | 2.5 | ○ |
| practical example 16 | residue | 1.5 | 1.0 | 0.001 | — | — | external force not required | 4.1 | ○ |
| practical example 17 | residue | 1.5 | 1.2 | 0.001 | — | — | external force not required | 3.1 | ○ |
| practical example 18 | residue | 1.5 | 1.4 | 0.001 | — | — | external force not required | 2.2 | ○ |

TABLE 1-continued

|  | contained component (mass %) | | | | | | bonding process | bonding strength (N/mm²) | hermetic test |
|---|---|---|---|---|---|---|---|---|---|
|  | Sn | Ge | Ni | Ir | Ag | Al | | | |
| practical example 19 | residue | 1.5 | 1.0 | 0.002 | — | — | external force not required | 3.6 | ○ |
| practical example 20 | residue | 1.5 | 1.0 | 0.005 | — | — | external force not required | 1.8 | ○ |
| practical example 21 | residue | 1.5 | 1.0 | 0.010 | — | — | external force not required | 1.6 | ○ |
| practical example 22 | residue | 2.0 | 0.7 | 0.001 | — | — | external force not required | 2.3 | ○ |
| practical example 23 | residue | 2.0 | 1.0 | 0.001 | — | — | external force not required | 1.1 | ○ |
| practical example 24 | residue | 2.0 | 1.2 | 0.001 | — | — | external force not required | 3.1 | ○ |
| practical example 25 | residue | 2.0 | 1.4 | 0.001 | — | — | external force not required | 4.0 | ○ |
| practical example 26 | residue | 2.5 | 0.7 | 0.001 | — | — | external force not required | 1.6 | ○ |

TABLE 2

|  | contained component (mass %) | | | | | | bonding process | bonding strength (N/mm²) | hermetic test |
|---|---|---|---|---|---|---|---|---|---|
|  | Sn | Ge | Ni | Ir | Ag | Al | | | |
| practical example 27 | residue | 2.5 | 1.0 | 0.001 | — | — | external force not required | 2.7 | ○ |
| practical example 28 | residue | 2.5 | 1.2 | 0.001 | — | — | external force not required | 3.9 | ○ |
| practical example 29 | residue | 2.5 | 1.4 | 0.001 | — | — | external force not required | 2.4 | ○ |
| practical example 30 | residue | 3.0 | 0.7 | 0.001 | — | — | external force not required | 2.0 | ○ |
| practical example 31 | residue | 3.0 | 1.0 | 0.001 | — | — | external force not required | 2.5 | ○ |
| practical example 32 | residue | 3.0 | 1.2 | 0.001 | — | — | external force not required | 2.9 | ○ |
| practical example 33 | residue | 3.0 | 1.4 | 0.001 | — | — | external force not required | 2.4 | ○ |
| practical example 34 | residue | 5.0 | 1.6 | 0.001 | — | — | external force not required | 1.5 | ○ |
| practical example 35 | residue | 5.0 | 2.5 | 0.001 | — | — | external force not required | 1.9 | ○ |
| practical example 36 | residue | 7.0 | 2.3 | 0.001 | — | — | external force not required | 2.5 | ○ |
| practical example 37 | residue | 7.0 | 3.5 | 0.001 | — | — | external force not required | 2.8 | ○ |
| practical example 38 | residue | 0.05 | 0.7 | 0.001 | — | — | external force not required | 1.1 | X |
| practical example 39 | residue | 0.1 | 0.7 | 0.001 | — | — | external force not required | 1.2 | X |
| practical example 40 | residue | 0.3 | 0.7 | 0.001 | — | — | external force not required | 1.8 | X |
| practical example 41 | residue | 0.5 | 0.5 | 0.001 | — | — | external force not required | 2.3 | X |
| practical example 42 | residue | 0.5 | 0.7 | 0.001 | — | — | external force not required | 2.0 | X |
| practical example 43 | residue | 0.7 | 0.2 | 0.001 | — | — | external force not required | 0.8 | X |
| practical example 44 | residue | 0.7 | 0.4 | 0.001 | — | — | external force not required | 1.4 | X |
| practical example 45 | residue | 0.7 | 1.4 | 0.001 | — | — | external force not required | 2.3 | X |
| practical example 46 | residue | 1.5 | 1.0 | 0.030 | — | — | external force not required | 1.5 | X |
| practical example 47 | residue | 1.5 | 1.0 | 0.050 | — | — | external force not required | 1.6 | X |
| comparative example 1 | residue | 0.3 | 2.0 | 0.001 | — | — | solid matter is generated and cannot be bonded | | |
| comparative example 2 | residue | 5.0 | 5.0 | 0.001 | — | — | solid matter is generated and cannot be bonded | | |
| comparative example 3 | residue | 7.0 | 7.0 | 0.001 | — | — | solid matter is generated and cannot be bonded | | |

TABLE 2-continued

| | contained component (mass %) | | | | | bonding process | bonding strength (N/mm²) | hermetic test |
|---|---|---|---|---|---|---|---|---|
| | Sn | Ge | Ni | Ir | Ag | Al | | |
| comparative example 4 | residue | — | — | 0.001 | 1.0 | — contact | 1.4 | X |
| comparative example 5 | residue | — | — | — | 3.5 | 0.3 ultrasonic | 0.7 | ○ |

Figure 5:
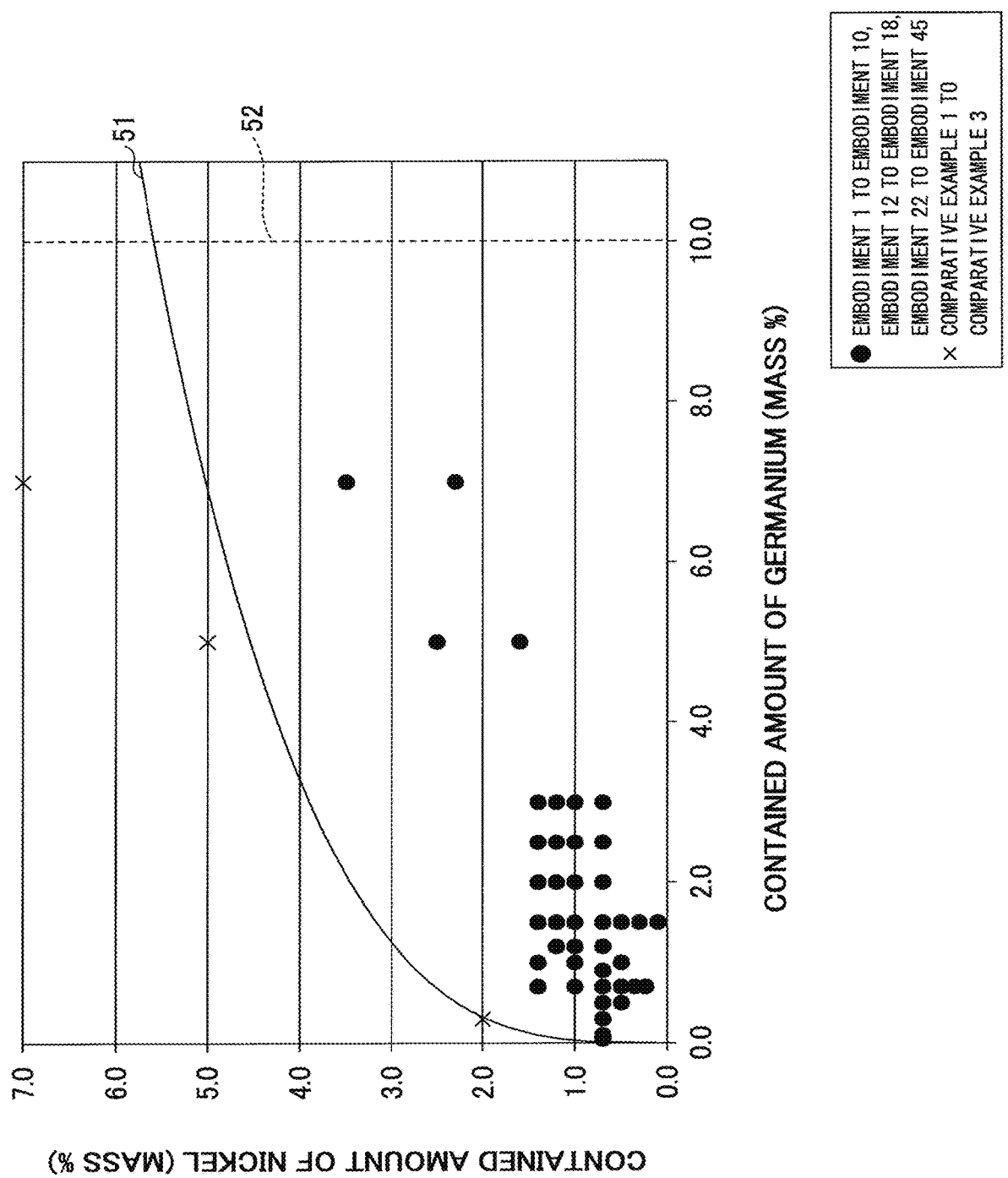
FIG. 5 is a diagram schematically illustrating a correlation between a contained amount of germanium and a contained amount of nickel of the compositions for bonding according to the practical examples and the comparative examples.

Here, in order to examine a relation between the contained amount of nickel and the contained amount of germanium in the deposition for bonding, points each composed of the contained amount of nickel, (vertical coordinate) and the contained amount of germanium (horizontal coordinate) are plotted in FIG. 5 for the practical examples 1 to 10, 12 to 18 and 22 to 45, and the comparative examples 1 to 3, which the composition for bonding contains Sn, Ge, Ni, and Ir. In any of the practical examples and the comparative examples, which are plotted in FIG. 5, the contained amount of iridium is 0.001 mass %. In FIG. 5, symbols of a black circle are assigned to the point of the practical examples 1 to 10, 12 to 18 and 22 to 45. Symbols of a cross are assigned to the points of the comparative examples 1 to 3.

Note that a curve 51 represents a relation $[Ni]=2.8\times[Ge]^{0.3}$, where [Ni] and [Ge] represent the contained amount of nickel and germanium in the composition for bonding, respectively. Moreover, a dotted line 52 represents a state in which the contained amount of germanium is 10 mass %.

From FIG. 5 it is found that in the case where the contained amount of nickel is greater than or equal to a value determined by a relation with the contained amount of germanium, i.e. in the case where the contained amount of nickel is greater than a value on the curve 51 in FIG. 5, such as the comparative examples 1 to 3, when the composition for bonding is melted, a granular solid is generated and materials to be bonded cannot be bonded.

Moreover, it can be confirmed that the points of the practical examples, plotted in FIG. 5, in which materials to be bonded can be bonded without performing the process of removing oxide layers using a solders iron or the like, distribute within a range in which the contained amount of germanium in the composition for bonding is 10 mass % or less.

From the aforementioned results, it can be confirmed that the materials to be bonded can be bonded without removing oxide layers, in the case where the composition for bonding contains Sn, Ge and Ni, a contained amount of germanium is 10 mass % or less, and the contained amount of germanium, [Ge], and a contained amount of nickel, [Ni], satisfy the following relation (1):

$$[Ni]\leq 2.8\times[Ge]^{0.3} \quad (1)$$

In addition, it was confirmed that in the practical examples 11, 19 to 21, 46 and 47, which are not plotted in FIG. 5, the contained amount of germanium was 10 mass % or less, and the contained amounts satisfied the aforementioned relation (1).

Figure 6:
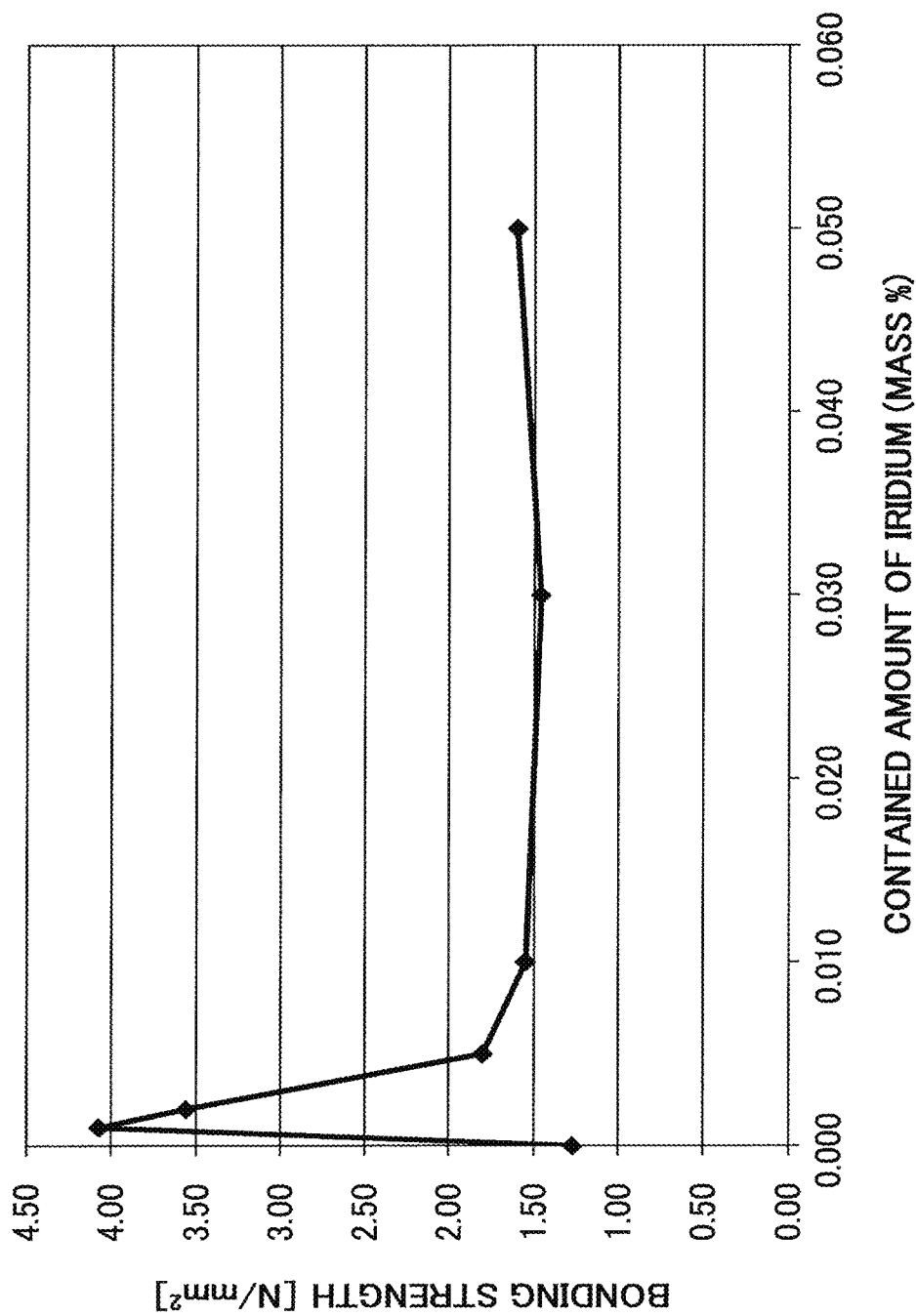
FIG. 6 is a diagram schematically illustrating a correlation between a contained amount of iridium and a bonding strength of the compositions for bonding according to the practical examples.

Next, in order to examine a relation between the contained amount of iridium in the composition for bonding and the bonding strength, points each composed of the contained amount of iridium (horizontal coordinate) and the bonding strength (vertical coordinate) are plotted in FIG. 6 for the practical examples 11, 16, 19 to 21, 46 and 47, in which only the contained amount of iridium in the composition for bonding is different.

According to the results shown in FIG. 6, it can be found that by adding iridium the bonding strength is increased. However, according to the study by the inventors of the present invention, although not illustrated in the drawings, when the contained amount of iridium exceeds 0.1 mass %, iridium may inhibit the bonding of the material to be bonded. Thus, the contained amount of iridium is preferably 0.1 mass % or less.

Moreover, for the practical examples 46 and 47, it is possible to confirm that, as shown in TABLE 2, the results of evaluation for the hermetic test are "fail". Thus, from the viewpoint of enhancing the hermetic sealing property between the materials to be bonded, the contained amount of iridium can be found to be more preferably 0.025 mass % or less.

Note that, as described above, for the practical examples 11, 19 and 20, eutectic substances in a cross section of the prepared composition for bonding were evaluated.

Results of the evaluation show that for the practical example 11, the number of circles, each formed for an eutectic substance in a square region 81 with an area of $1.0\times10^6$ μm² and having a diameter of 220 μm or more, was two. For each of the practical examples 19 and 20, any of diameters of circles formed in the same way as above were less than 220 μm.

In the practical examples 11, 19 and 20, only the contained amount of iridium varies. In the practical example 11, the contained amount of iridium is 0 mass %. In the practical examples 19 and 20, the contained amounts of iridium are 0.002 mass % and 0.005 mass %, respectively.

Then, from the aforementioned results, it could be confirmed that when the composition for bonding contained iridium, coarsening of eutectic crystals contained in the composition for bonding could be controlled.

Moreover, as described above, for the practical example 16 the environmental test was performed, the results of the evaluation was "pass". That is, it could be confirmed that the practical example 16 passed the environmental test. Therefore, it could be confirmed that even if the composition for bonding was placed for a long time under an environment of a high temperature and a high humidity, a hermetic sealing property of the composition for bonding could be maintained.

Figure 7:
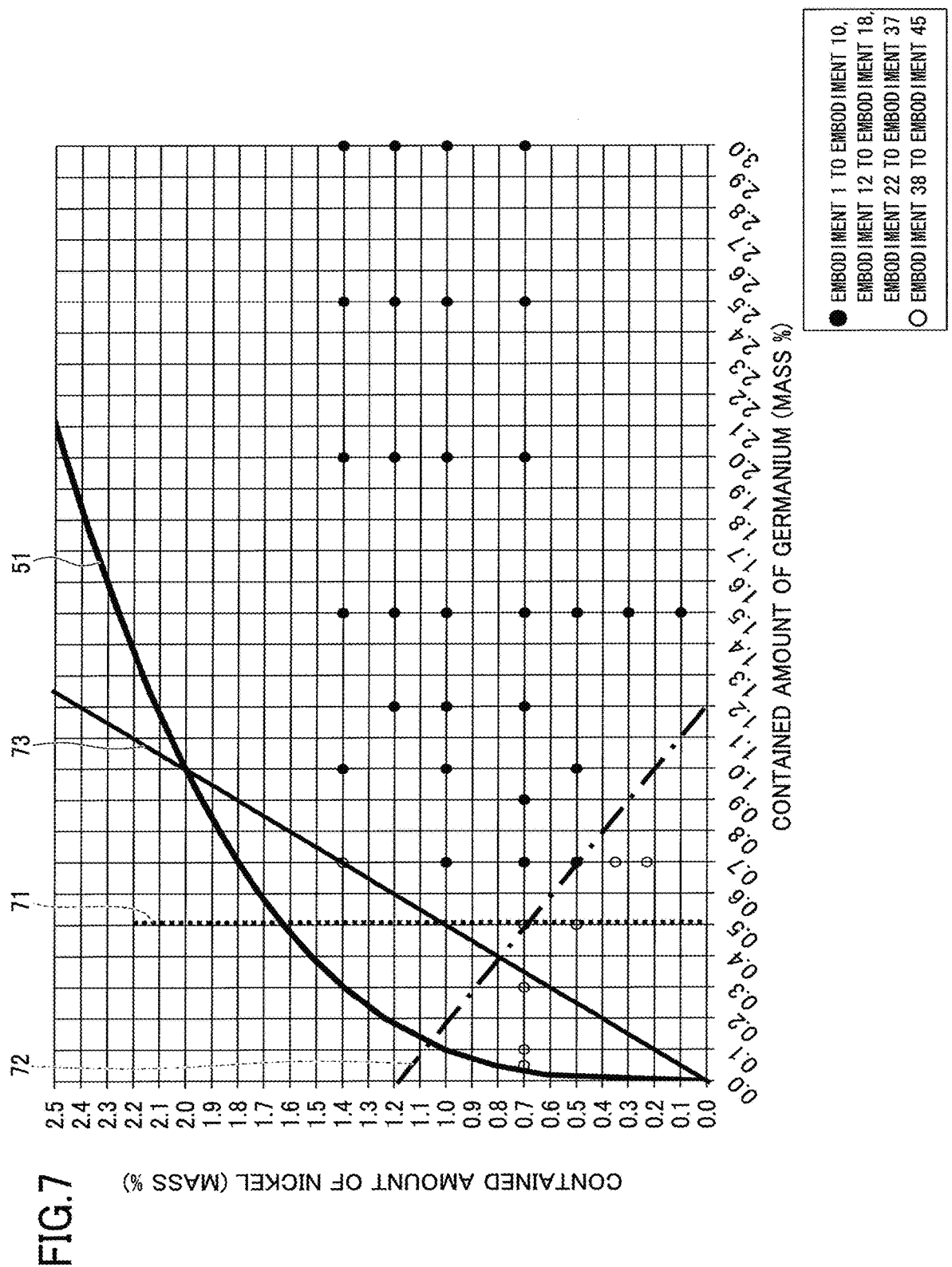
FIG. 7 is a diagram schematically illustrating a correlation between the contained amount of germanium and the contained amount of nickel of the compositions for bonding according to the practical examples and the comparative examples.

Next, FIG. 7 is an enlarged diagram of a part of the graph illustrated in FIG. 5. Note that, in FIG. 7, the points of the practical examples 38 to 44, in which the results of evaluation for the hermetic test were "fail", are indicated by outlined circles.

Note that in FIG. 7, a dotted line 71 indicates the contained amount of germanium of 0.5 mass %. A dot dashed line 72 indicates a relation between the contained amount of germanium, [Ge], and the contained amount of nickel, [Ni], i.e. [Ge]+[Ni]=1.2 mass %. Moreover, a linear line 73 indicates a relation between the contained amount of nickel, [Ni], and the contained amount of germanium, [Ge], i.e. [Ni]=2.0×[Ge]. Furthermore, the curve line 51 indicates the relation [Ni]=2.8×[Ge]$^{0.3}$, described with reference to FIG. 5.

From FIG. 7, it could be confirmed that when the contained amount of germanium is greater than 0.5 mass %, a sum of the contained amount of germanium and the contained amount of nickel is greater than 1.2 mass %, and a value obtained by dividing the contained amount of nickel by the contained amount of germanium is less than 2.0, results of evaluation for the hermetic test were "pass". That is, it could be confirmed that the hermetic sealing property of materials to be bonded was enhanced.

As described above, the composition for bonding has been described with embodiments, practical examples and the like. However, the present invention is not limited to the aforementioned embodiments, practical examples and the like. Various variations and modifications may be made without departing from the scope of the present invention recited in claims.

What is claimed is:

1. A composition for bonding consisting of tin, iridium, germanium, nickel, optionally zinc, optionally oxygen, and an unavoidable component,
    wherein a contained amount of iridium is greater than or equal to 0.0005 mass % and less than or equal to 0.1 mass %;
    wherein a contained amount of germanium is less than or equal to 10 mass %,
    wherein a contained amount of nickel in mass % is greater than or equal to 0.1 mass % and less than or equal to a product of 2.8 multiplied by a term that is the contained amount of germanium in mass % to the power of 0.3,
    wherein, if zinc is present, a contained amount of zinc is greater than or equal to 0 mass % and less than or equal to 0.5 mass %, and
    wherein, if oxygen is present, a contained amount of oxygen is greater than or equal to 0.0001 mass % and less than or equal to 2 mass %.

2. The composition of claim 1,
    wherein the contained amount of iridium is less than or equal to 0.025 mass %.

3. The composition of claim 1,
    wherein the contained amount of germanium is greater than 0.5 mass %,
    wherein a sum of the contained amount of germanium and the contained amount of nickel is greater than 1.2 mass %, and
    wherein a value obtained by dividing the contained amount of nickel in mass % by the contained amount of germanium in mass % is less than 2.0.

4. A method of bonding a material to be bonded provided with a bonding portion containing an oxide, the method comprising contacting the material with the composition for bonding according to claim 1.

5. The method of claim 4, wherein the bonding portion of the material to be bonded contains at least one type of oxide selected from the group consisting of a glass, a chrome oxide, and an aluminum oxide.

6. The composition of claim 1,
    wherein in a cross section of the composition, a number of circles in a region with an area of $1.0 \times 10^6$ μm$^2$, each circle inscribing a eutectic substance at a minimum diameter that is greater than or equal to 220 μm, is less than or equal to two, or a number of circles in the region with an area of $1.0 \times 10^6$ μm$^2$, each circle inscribing a eutectic substance at a minimum diameter that is greater than or equal to 350 μm, is less than or equal to one.

7. The composition of claim 1, wherein the contained amount of iridium is greater than or equal to 0.001 mass %.

8. The composition of claim 1, wherein the contained amount of iridium is less than or equal to 0.005 mass %.

9. The composition of claim 1, wherein a total amount of Fe, Co, Cr, V, Mn, Sb, Pb, Bi, Zn, As and Cd is less than or equal to 500 ppm.

10. The composition of claim 9, wherein the contained amount of germanium is greater than 0.5 mass %,
    wherein a sum of the contained amount of germanium and the contained amount of nickel is greater than 1.2 mass %, and
    wherein a value obtained by dividing the contained amount of nickel in mass % by the contained amount of germanium in mass % is less than 2.0.

11. The composition of claim 9, which does not contain Ag.

12. The composition of claim 9, wherein the contained amount of germanium is greater than 0.5 mass %, and
    wherein a sum of the contained amount of germanium and the contained amount of nickel is greater than 1.2 mass %.

13. The composition of claim 1, wherein the contained amount of germanium is greater than 0.5 mass %, and
    wherein a sum of the contained amount of germanium and the contained amount of nickel is greater than 1.2 mass %.

14. The composition of claim 1, which does not contain Ag.

15. The composition of claim 14, wherein the contained amount of iridium is greater than or equal to 0.001 mass %.

16. The composition of claim 14, wherein the contained amount of iridium is less than or equal to 0.005 mass %.

17. The composition of claim 14, wherein the contained amount of germanium is greater than 0.5 mass %,
    wherein a sum of the contained amount of germanium and the contained amount of nickel is greater than 1.2 mass %.

* * * * *